Nov. 23, 1971  B. A. ANDRUSHKIW ET AL  3,621,729

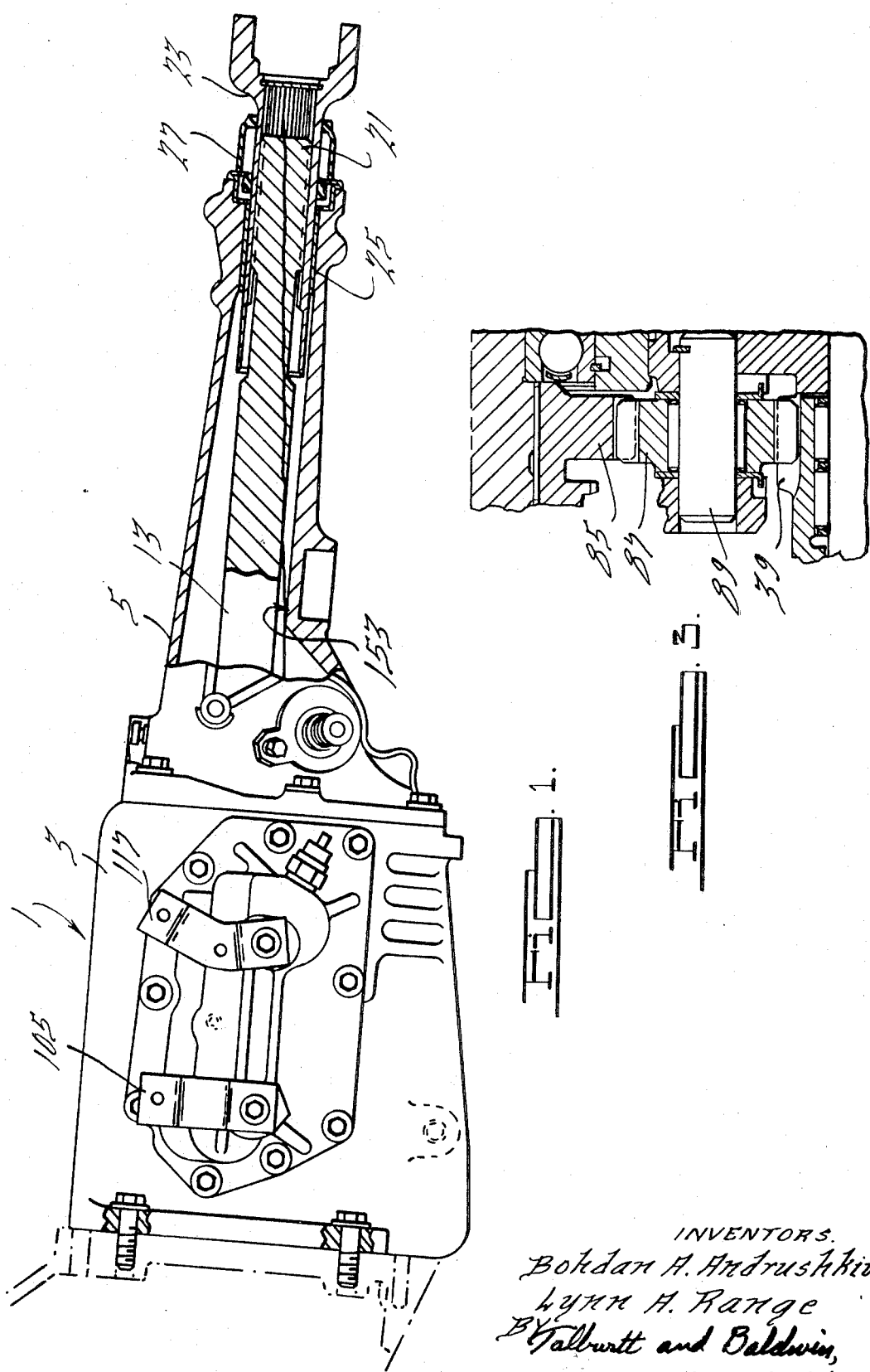

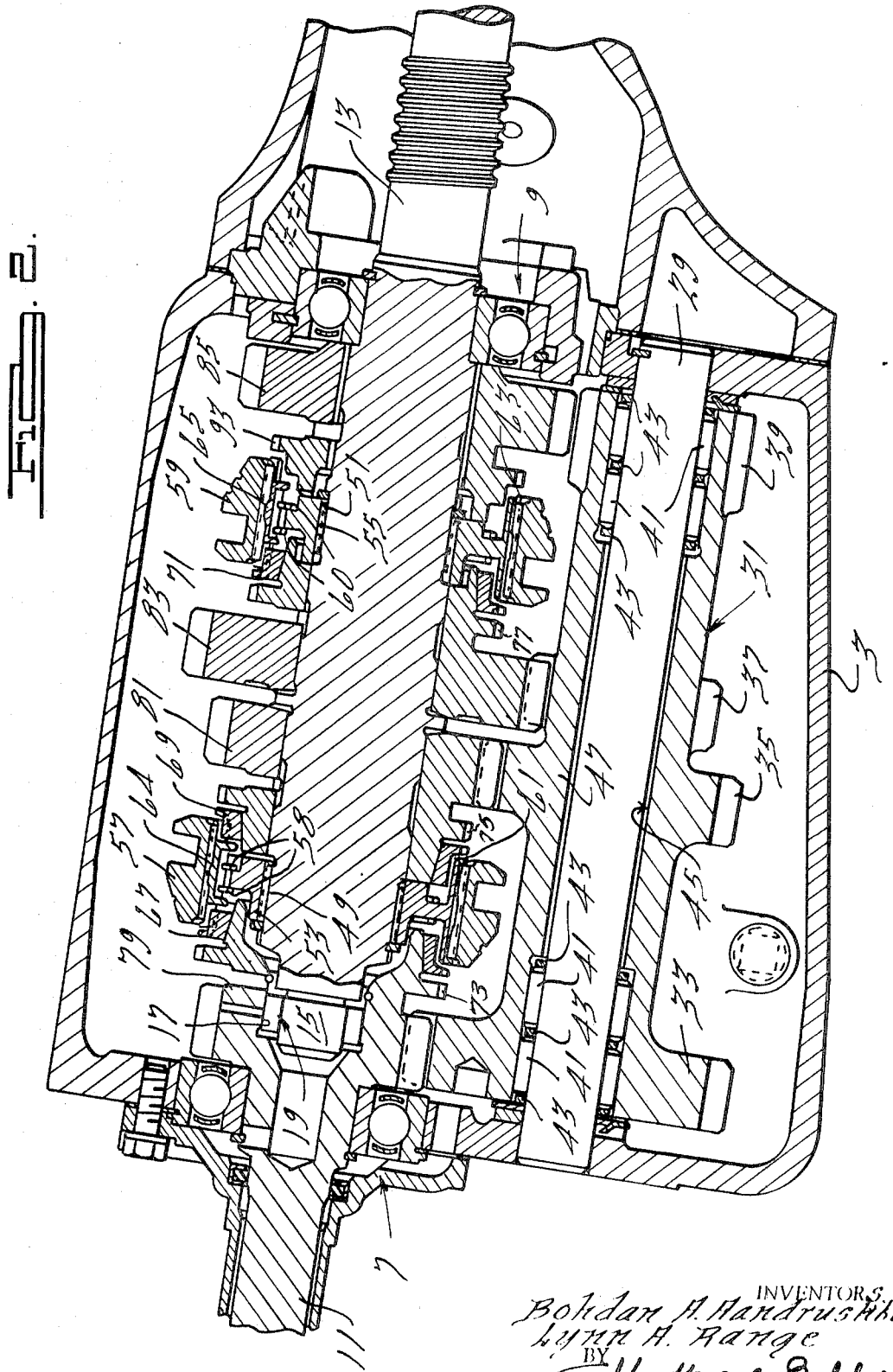

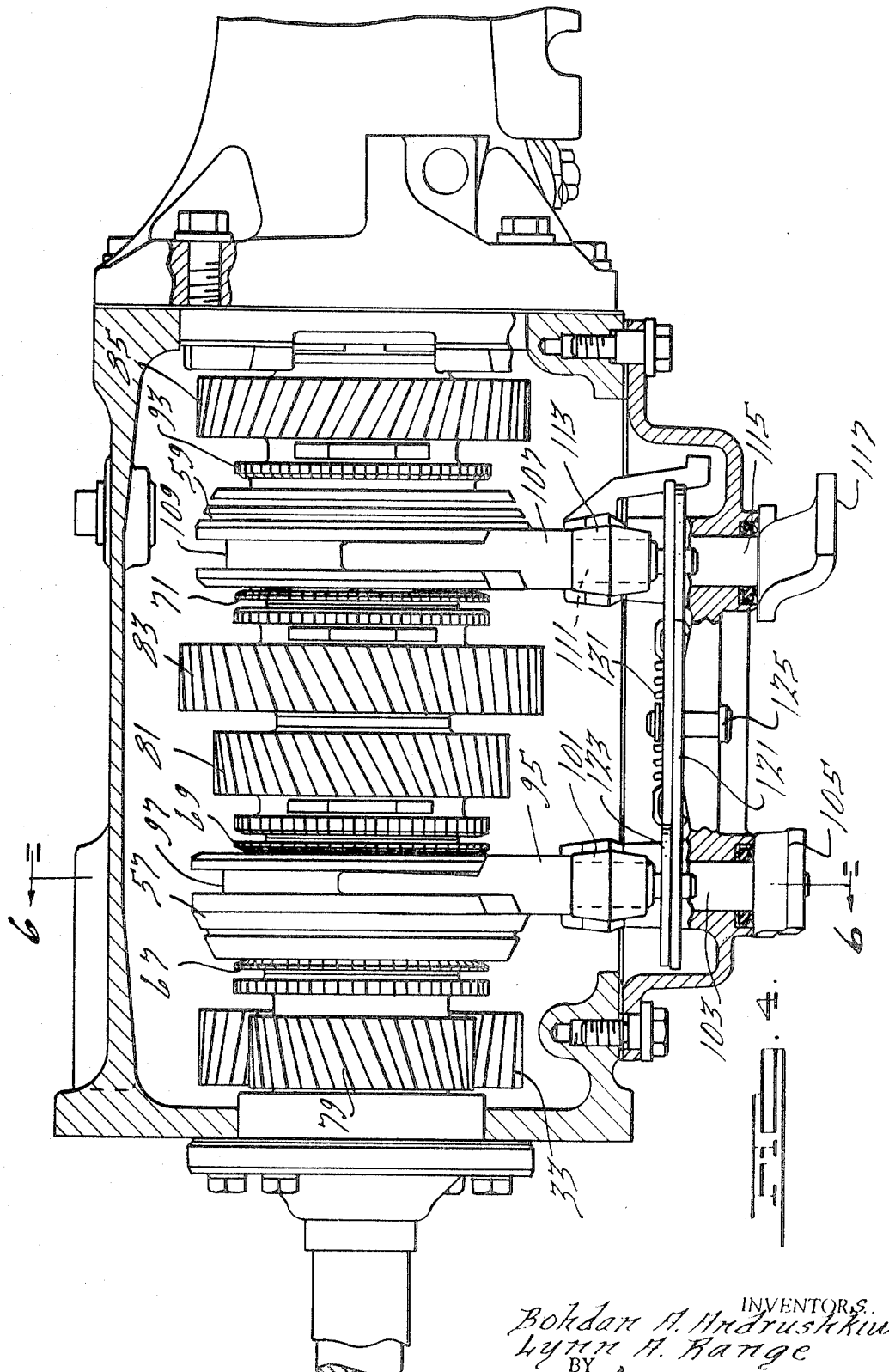

TRANSMISSION

Filed March 13, 1970  4 Sheets-Sheet 4

INVENTORS
Bohdan A. Andrushkiw
Lynn A. Range
BY Talbutt and Baldwin,
ATTORNEYS.

United States Patent Office 3,621,729
Patented Nov. 23, 1971

3,621,729
TRANSMISSION
Bohdan A. Andrushkiw, Dearborn Heights, and Lynn A. Range, Detroit, Mich., assignors to Chrysler Corporation, Highland Park, Mich.
Filed Mar. 13, 1970, Ser. No. 19,375
Int. Cl. F16h 5/08, 3/08; G05g 5/10
U.S. Cl. 74—335
2 Claims

ABSTRACT OF THE DISCLOSURE

A fully synchronized three forward speed transmission with interlock levers to prevent engagement of more than one gear at a time. The housing is constructed to provide a dam for retaining a supply of lubricant adjacent a rear bearing for the mainshaft.

BACKGROUND OF THE INVENTION

This invention relates to transmission, and more particularly to a fully synchronized three speed transmission having manually operated means for changing and selecting transmission speeds.

Transmissions of this type are particularly applicable to automotive vehicles. Many of these transmissions are large and expensive in construction.

BRIEF SUMMARY OF THE INVENTION

Briefly, this invention relates to a transmission having an input shaft which is adapted to be clutched directly to the output shaft to provide a direct drive or third gear ratio. A countershaft is continuously driven by the input shaft and may be clutched through three other gear sets to provide first, second and reverse gear ratios, the latter being accomplished through a reverse idler gear.

One of the primary objects of this invention is to provide a transmission in which all three forward gear ratios are adapted for synchronized engagement to facilitate shifting from one ratio to another.

Another object of this invention is to provide a transmission of the class described in which lubricating fluid is maintained adjacent the rear seal on the output shaft to the transmission.

A further object of this invention is to provide a transmission such as described having a compact design.

Another object of this invention is to provide a transmission of the type described which is economical in construction and efficient in operation.

Other objects and advantages of this invention will become apparent as the description progresses.

BRIEF DESCRIPTION OF THE DRAWINGS

In the accompanying drawings in which one of various possible embodiments of this invention is illustrated;

FIG. 1 is a side elevation of a preferred embodiment of this invention, certain portions being broken away and shown in section for clarity;

FIG. 2 is an enlarged axial section of a portion of FIG. 1;

FIG. 3 is an enlarged section of a fragment of FIG. 1;

FIG. 4 is an enlarged plan view of a portion of FIG. 1, certain parts being removed and other parts being shown in section for clarity;

Like parts are indicated by corresponding reference characters throughout the several view of the drawings.

DESCRIPTION OF THE PREFERRED EMBODIMENT

Figure 5:
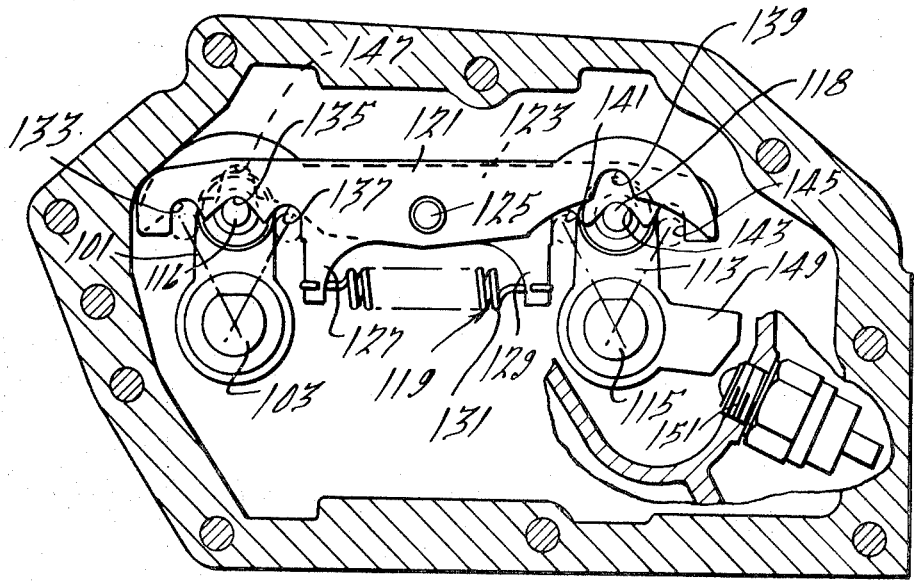
FIG. 5 is an enlarged fragmentary view of FIG. 1, certain parts being removed and other parts shown in section for clarity.

Referring now to the drawings, a transmission of this invention is generally indicated at 1. It comprises a case 3 and extension housing 5. These components are normally mounted in a vehicle on an inclined axis, the angle of incline being 3° to 5°, for example. Coaxially situated within the case 3 are bearing asemblies 7 and 9 (FIG. 2) which respectively serve to journal one end of a transmission input shaft 11 and a main or output shaft 13. The innermost end 15 of shaft 13 is piloted wtihin a suitable bore 17 of input shaft 11 as by bearings 19. The outermost or rear end 21 of shaft 13 is mounted in a yoke 23 rotatably received in the rearward end of extension housing 5 by means of a bushing 25. A seal 27 is provided between the yoke 23 and the extension housing.

A countershaft 29, suitably journaled in case 3, rotatably supports a gear cluster 31 comprised of gears 33, 35, 37 and 39. Cluster 31 may be supported on countershaft 29 by a plurality of bearings 41 axially separated by washers 43. The bore 45 in cluster 31 through which countershaft 29 passes is counterboard at its ends to receive the bearings 41, the counterboring providing a centrally located elongated integral spacer 47 between the bearings.

Splined portions 49 and 51, formed on mainshaft 13, slideably receive hubs or clutches 53 and 55 by internally formed splines. Clutch sleeves 57 and 59 are slidingly engaged with external splines 61 and 63 formed on the periphery of hubs 53 and 55. Springs 58 and 60 urge struts 64 and 65 outwardly against the clutch sleeves. Synchronizing rings 67, 69 and 71 are provided and cooperate with the struts 64, 65 to permit the clutch sleeves 57 and 59 to be selectively and synchronously engaged with any of the clutch teeth 73, 75 and 77 of gears 79, 81 and 83, respectively.

Gear 79, a direct drive or third speed gear, is in constant mesh with gear 33 of gear cluster 31, the second speed gear 81 is in constant mesh with gear 35, and the low or first speed gear 83 is in constant mesh with gear 37. Gears 81 and 83 are freely rotatable on mainshaft 13.

A reverse gear 85 is rotatably mounted on mainshaft 13 between slider 59 and the bearing 9. A reverse idler gear 87 (FIG. 3) is mounted on a shaft 89 and is in constant mesh with reverse gear 85 and gear 39 on gear cluster 31. The reverse gear is coupled to the mainshaft upon movement of slider or sleeve 59 to the right, as viewed in FIG. 2, and engagement of the internal teeth of the sleeve with clutch teeth 93 on reverse gear 85.

Figure 6:
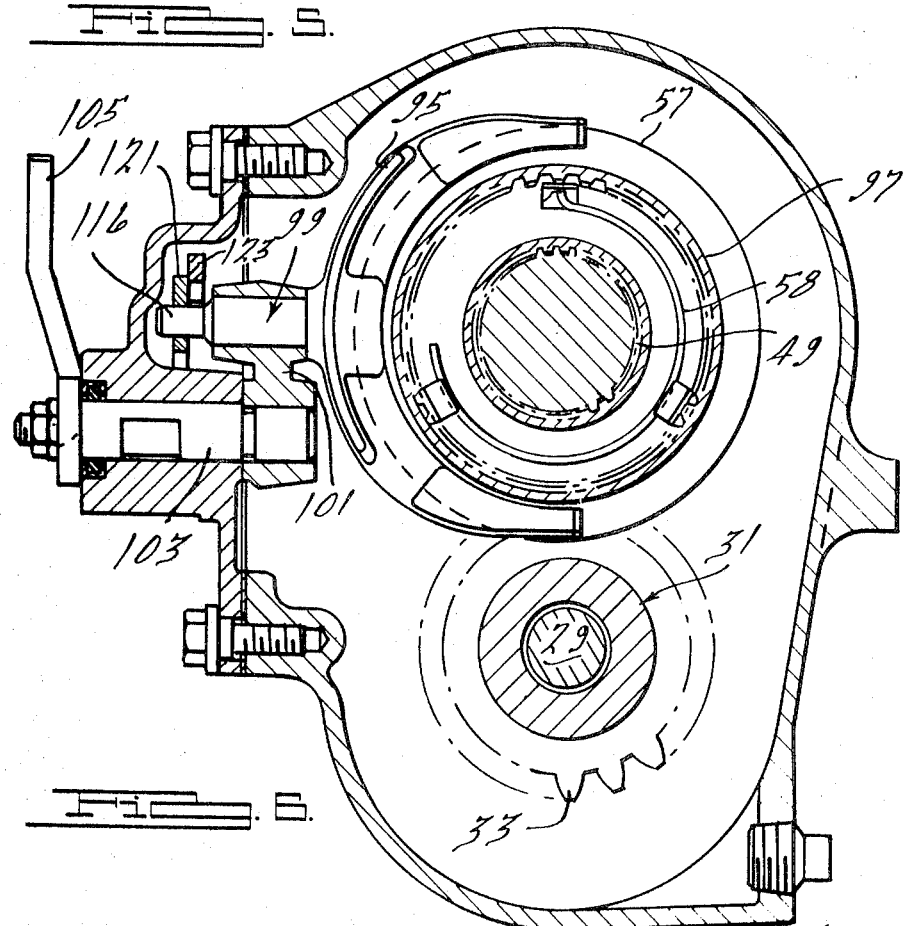
FIG. 6 is a section taken generally along line 6—6 of FIG. 4.

A shift fork 95, received in a groove 97 in clutch sleeve 57, and journaled at 99 (FIGS. 4 and 6) within a rocker arm 101, is employed for moving second and third speed clutch sleeve 57 axially so as to engage either the clutch teeth 73 of the third speed gear 79 or the clutch teeth 75 of the second speed gear. Rocker arm 101 is pivotally supported by and secured to a rocker shaft 103 journaled in the casing 3. An actuating or control arm 105 is connected to the outer end of shaft 103. Similarly, a second shift fork 107, received in a groove 109 of sleeve 59 and journaled at 111 within a rocker arm 113, is employed for moving sleeve 59 axially into engagement with the clutch teeth 77 of first speed gear 83 or teeth 93 of reverse gear 85. Rocker arm 113 is pivotally supported by and secured to a rocker shaft 115 journaled in casing 3 and having an actuating or control arm 117 secured thereto externally of the casing. The shafts of forks 95 and 107 have pins or locking members 116 and 118 extending from one end thereof.

A spring loaded interlocking device 119 is provided in casing 3. Device 119 comprises a pair of substantially identical levers 121 and 123 pivotally mounted on a pin 125. Each lever has a downwardly extending arm 127 and 129 between which a spring 131 extends. Spring 131 biases lever 121 counterclockwise and lever 123 clockwise as viewed in FIG. 5. Lever 121 has three notches in the lower edge of one end thereof, the notches or recesses being identified as a third speed notch 133, a neutral notch 135 and a second speed notch 137. A locking notch 139 is provided in the other end of the lever 121. Lever 123 has three notches in the lower edge of one end thereof, the notches being identified as a first speed notch 141, a neutral notch 143 and a reverse notch 145. A locking notch 147 is provided in the other end of lever 123.

Rocker arm 113 has a lateral extension 149 which, when arm 113 is moved to a reverse position, will actuate a reverse switch 151 to cause a reverse or backup lamp (not shown) to be energized.

The internal portion of the extension housing 5 just rearwardly of the casing 3 is so constructed that the bottom thereof is relatively close to the mainshaft or output shaft 13. This provides a dam 153 since the axis of the shaft 13 is inclined, which dam serves to maintain a supply of lubricant adjacent the rearward end of the extension housing 5 around bearing 27. The provision of this dam 153 insures that an adequate supply of lubricant is maintained adjacent bearing 27.

Operation of the apparatus is as follows:

Assuming the transmission is in a neutral position, i.e., the position shown in FIGS. 2, 4 and 5, a first speed drive condition is obtained by rotating lever 117 counterclockwise. This causes rocker arm 113 to rotate counterclockwise as viewed in FIG. 5. In so moving, the pin 118 cams the lever 123 counterclockwise to drop notch 147 over pin 116 and prevent inadvertent movement of the latter. As the fork 107 is moved to the left as viewed in FIG. 4, the speeds of the shaft 11 and the shaft 13 are synchronized due to the action of ring 71 and struts 65 and the sleeve positively couples the shaft to the gear. When the sleeve is moved completely to the position wherein gear 83 and the shaft 13 are coupled, the pin 118 will be aligned with notch 141 and the lever 123 will drop onto the pin 118. In such position the pin 118 is against the lower surface of the lever 121 and thus prevents clockwise movement of the latter. This, in turn, prevents any substantial movement of pin 116 and consequently shaft 103 and fork 95.

The transmission is shifted from the first speed condition to a second speed condition by clockwise movement of lever 105. However, the pin 116 and lever 121 cannot be moved until pin 118 is moved back into alignment with locking notch 139. Clockwise movement of lever 105 causes rocker arm 101 to swing fork 95 to the right as viewed in FIGS. 2 and 4, thus coupling gear 81 with output or mainshaft 13 through the synchronizing elements 64, 69 and the clutch teeth of gear 81 in mesh with the internal teeth of sleeve 57.

The transmission is shifted from a second speed condition to a direct drive or third speed condition by counterclockwise movement of lever 105. This causes the gear 81 to be disengaged with shaft 13 and gear 17 to be coupled with the shaft 13. The transmission is placed in reverse by bringing the input shaft to a stop (applying the clutch and brake pedals, not shown) and moving lever 117 clockwise to move fork 107 and sleeve 59 to the right to couple the gear 85 with shaft 13. When the lever 117 is moved clockwise the arm 149 actuates backup switch 151. Also, the pin 118 drops into reverse notch 145 in lever 123. Also, the pin is adjacent the lower edge of the right-hand end lever 121 and prevents substantial movement of the latter.

The dam 153, due to the inclination of the axis of the mainshaft 13, prevents the escape of a supply of lubricant for the bearing 27. If the dam 153 were not utilized, a considerable greater amount of lubricant would have to be maintained in extension housing 5 to provide adequate lubrication of the bearing 27.

Although only one embodiment of the invention has been disclosed and described, it is apparent that other embodiments and modifications of the invention are possible.

We claim:

1. In a multiple speed power transmission mechanism having a housing means, a power input shaft, a power output shaft, a direct drive gear connected to said power input shaft, a cluster gear assembly having one gear portion meshed with said direct drive gear, and first, second and reverse gear portions thereon, a first, second, and reverse gear freely journaled on said power output shaft, a reverse idler gear in constant mesh with said reverse gear portion, said first, second and reverse gears being in constant mesh with said first and second gear portions and said reverse idler gear, respectively, a first manually axially positionable clutch member adapted for manual actuation to positions in which driving engagement is achieved between said first gear and said power output shaft or driving engagement is achieved between said reverse gear and said power output shaft, a second manually, axially positionable clutch member adapted for manual actuation to positions in which driving engagement is achieved between said second gear and said power output shaft or driving engagement is achieved between said direct drive gear and said power output shaft, interlock means mounted in said housing means for preventing simultaneous engagement of more than one of said direct drive, first, second and reverse gears with said power output shaft, said housing including bearing means for supporting the rearward end of said output shaft, said housing means including dam means for inhibiting the flow of lubricant adjacent said bearing means forwardly from the rearward portion of said housing means, a switch, and actuating means connected to move when said first clutch member is moved, said actuating means comprising a rocker arm, a rocker shaft on which said rocker arm is mounted, said rocker arm having a lateral extension, said rocker arm and extension being rotated when the first clutch is moved to the position in which driving engagement is achieved between said reverse gear and said power output shaft, said switch being in the line of movement of said extension, said extension, when so rotated, actuating said switch, said interlock means including a pair of levers pivotally mounted in said housing and adapted to pivot about the same axis, each of said levers having a plurality of notches on one end and one notch on the other end, pins connected to move with said clutch members, said pins being movable between certain of said notches, said levers blocking movement of one of said pins when the other pin is moved, said levers having downwardly extending arms, and a spring extending between said arms.

2. A multiple speed transmission mechanism comprising a casing, power input and power output shafts concentrically journaled in said casing, a cluster gear assembly rotatably journaled in said casing about an axis parallel to the axes of said input and output shafts, a first gear fixedly secured to said input shaft for forced rotation therewith, a driven gear formed on said cluster assembly continually in meshed engagement with said first gear, a low speed forward drive gear freely rotatably journaled on said output shaft, a second speed forward drive gear freely rotatably journaled on said output shaft and located adjacent said low speed gear, a first generally axially directed splined portion formed on said output shaft intermediate said first gear and second speed gears, an internally splined first hub member received on said first splined portion, a first clutch sleeve, first peripheral axially directed splines formed on said hub adapted to slidingly engage internally formed splines of said first clutch sleeve, a circumferential groove formed in said first clutch sleeve for receiving therein at least a part of a yoke portion of a first shifter fork, first clutch teeth on said first gear, second clutch teeth on said second speed gear, a second generally axially directed splined portion formed on said output shaft, said low speed forward drive gear being freely rotatably journaled on said output shaft axially intermediate said second speed gear and said second splined portion, an internally splined second hub member received on said second splined portion, second axially directed splines formed peripherally on said second hub and adapted to slidingly engage internally formed splines of a second clutch sleeve, a circumferential groove formed in said second clutch sleeve for at least partly receiving therein a second shifter fork, third clutch teeth on said low speed forward drive gear, a low speed cluster gear in said cluster assembly in continuous meshed engagement with said low speed forward gear, a second speed cluster gear in said cluster assembly in continuous meshed engagement with said second speed forward gear, a manual shift control means for moving said shifter forks, said shift control means comprising a pair of shift levers pivotally mounted on said casing at spaced parallel axes, each shift lever being rotatable from a neutral position to a shift position and having a locking member thereon rotatable with the lever, a pair of stamped plate interlock levers each having a central pivot, and on one side of said pivot an edge surface, a locking recess extending therefrom into the lever and a spring anchor arm extending downwardly therefrom between said parallel axes, and at the other side of said pivot a neutral recess and a shift position recess extending inwardly from the edge of the lever, said levers being pivotally mounted on said support between said spaced parallel axes and located in opposite relationship with a locking recess on one lever and the neutral and shift position recesses on the other lever being engageable with each locking member, a tension spring attached to said downwardly extending spring anchors biasing both levers to urge the neutral and shift position recesses into engagement with the cooperating locking member to resiliently hold the cooperating locking member in each position, each locking member on movement from the neutral position to the shift position engaging one interlock lever between the neutral and shift position recesses and rotating the one interlock lever to move the locking recess at the other end into engagement with the other locking member to hold said other locking member in neutral position and said edge surface preventing rotation of the one interlock lever and locking member when the other locking member is not in the neutral position.

References Cited
UNITED STATES PATENTS

| | | | |
|---|---|---|---|
| 2,968,190 | 1/1961 | Orr | 74—467 |
| 3,088,336 | 5/1963 | Fodrea | 74—333 X |
| 3,264,894 | 8/1966 | Popovich et al. | 74—477 |
| 3,292,442 | 12/1966 | Ivanchich | 74—335 |
| 3,319,479 | 5/1967 | Iavelli et al. | 74—335 X |
| 3,354,739 | 11/1967 | Ivanchich | 74—331 X |
| 3,527,116 | 9/1970 | Kimberlin | 74—335 X |

ARTHUR T. McKEON, Primary Examiner

U.S. Cl. X.R.

74—333 (Disel), 477